Nov. 15, 1966     B. E. O'CONNOR     3,285,096
TORSIONAL VIBRATION DAMPER Filed July 29, 1964                                  4 Sheets-Sheet 1

INVENTOR.
Bernard E. O'Connor
BY
Barnard, McGlynn & Reising
ATTORNEYS

Nov. 15, 1966  B. E. O'CONNOR  3,285,096
TORSIONAL VIBRATION DAMPER
Filed July 29, 1964  4 Sheets-Sheet 2

INVENTOR.
Bernard E. O'Connor
BY
Barnard, McGlynn & Reising
ATTORNEYS

Fig. 9

United States Patent Office 3,285,096
Patented Nov. 15, 1966

3,285,096
TORSIONAL VIBRATION DAMPER
Bernard E. O'Connor, 8904 Rindge,
Playa Del Rey, Calif.
Filed July 29, 1964, Ser. No. 385,950
29 Claims. (Cl. 74—574)

This invention relates to torsional vibrtion dampers for reciprocating engine crankshafts and the like and more particularly to an improved torsional vibration damper incorporating a resilient inertia mass which can be tuned to a desired natural frequency for coupling to the crankshaft or other rotary member subject to the torsional vibration, and incorporating means whereby the torsional vibratory energy can be absorbed and dissipated either through a friction coupling or a viscous fluid coupling.

In any system wherein periodic force input is converted to rotary motion or torque by the application of the periodic force input to a torsionally resilient shaft or other rotary member, there is a tendency for the system to be excited into torsional vibration. In reciprocating type internal combustion engines, wherein periodic force input from the pistons is applied as periodic torsional impulses to a resilient crankshaft, the phenomenon manifest itself by way of torsional vibration or oscillation of the crankshaft. Such crankshaft vibration is of course undesirable and at high amplitudes, at or in the vicinity of the resonant frequency of the system, can be destructive; hence the well known and established need for a vibration damper coupled to the crankshaft for absorption and dissipation of the torsional vibratory energy.

In general, crankshaft torsional vibration damper systems which have been used in the past fall into one of four categories. One such system is the dynamic vibration suppressor which can take the form of a flywheel coupled to the crankshaft by mechanical springs. Such a system is not a damper in the true sense but rather operates only to alleviate or eliminate the amplitude of vibration at the particular frequency or frequencies to which it is tuned. Hence, devices of this type while successful for more or less constant speed engines or engines wherein the vibration amplitude is significant only at certain engine speeds, are not practical for engines wherein damping is essential over an entire speed range for a large number of critical speeds.

Another type suppressor, similar in some respects to the spring mounted flywheel, is the tuned centrifugal pendulum. This device is effective in suppressing a given order of vibration at any engine speed; however, since most reciprocating type engines require the suppression or absorption of more than one order of vibration, it would be necessary to use a plurality of tuned centrifugal pendulums. Further, the centrifugal pendulum in its best present configuration is short lived because of the high contact stresses.

A third general type torsional vibration damper system employs a torsional inertia mass, such as a flywheel, which is frictionally coupled to the crankshaft whereby the rotational inertia of the flywheel resists rapid accelerations and hence applies frictional braking to the crankshaft to absorb and dissipate a large amount of the torsional vibratory energy. The difficulty with a system of this type is that in the absence of a flywheel or inertia mass wherein the effective inertia varies in accordance with damping requirements and in the absence of a frictional coupling which automatically adjusts in accordance with the requirements; there is effective damping only at a certain engine speed or speeds.

The fourth general type damper system is the so-called viscous damper which is similar to the friction damper except that instead of using a friction coupling, a coupling through a viscous fluid is used whereby the vibratory energy is absorbed and dissipated by reason of the shear modulus of the viscous fluid. Viscous dampers are in principle superior to friction dampers; however here again, in the absence of an interia mass and coupling which automatically adjust to the characteristics of the torsional vibration of the crankshaft, the damper is relatively inefficient.

Various concepts have been proposed for modifying friction or viscous dampers by providing a rotational mass or flywheel connected to the crankshaft through the friction or viscous coupling and having an effective inertia which varies in accordance with the frequency of the torsional vibration of the crankshaft. One such concept involves the use of a rotational inertia mass which is resiliently suspended from the crankshaft and which is tuned to a predetermined resonant frequency to best meet the damping requirements for the particular engine in which it is to be used. However, attempts to embody these concepts in a pracitical damper have not been successful for various reasons. First, because of the relatively high and continual stresses imposed, the resilient member or members are highly subject to fatigue failure. Secondly, and particularly where the materials or designs for the resilient member or members are selected to minimize the possibility of failure, the construction is so expensive as to preclude commercial success. Thirdly, and perhaps most importanly, it has not been possible to tune the resilient inertia mass to a low natural resonant frequency while at the same time maintaining a structural strength even close to that required for reasonably long damper life. It so happens that for many if not most reciprocating engine designs, truly effective damping over a wide speed range necessitates that the resilient inertia mass be tuned to a relatively low frequency.

It is an object of the present invention to provide an improved torsion vibration damper, particularly useful as a crankshaft damper in reciprocating type engines, which is effective to damp vibration over a wide speed range, which is extremely durable and which can be manufactured at relatively low cost. More specifically, the invention has as one of its objects the provision of a torsional damper incorporating a resilient inertia mass which is subject to low stress but which can be tuned to a relatively low frequency. A further object of the invention is to provide a torsional vibration damper incorporating a composite resilient inertia mass together with means cooperative with the composite resilient inertia mass to absorb and dissipate the vibratory energy, preferably by a friction or by a viscous coupling. Still another object of the invention is the provision of a crankshaft torsioinal vibration damper incorporating a resilient inertia mass and a vibratory energy absorbing and dissipating coupling, the structure of the resilient inertia mass and the structure and location of the coupling being such as to provide effective damping over a wide engine speed range while at the same time allowing low cost manufacture of the damper. Another object of the invention is the provision of a viscous damper of the type having a centrifugal inertia mass with at least a portion thereof housed within a mass of viscous fluid which rotates with the inertia mass and wherein the housing for the viscous fluid is such as to provide high strength and therefore optimum assurance against rupture while at the same time being of extremely light weight to thereby improve efficiency of operation.

Briefly, these and other objects are accomplished, in accordance with the preferred embodiment of the invention, by a torsional vibration damper which includes a generally annular inertia mass having a hub fixably secured to the crankshaft, and having a plurality of coaxial closely spaced resilient distortable ring-shaped elements each connected to the hub by a single spoke which is at 180° to the spoke of the next adjacent element. Hence, when torsional vibration occurs in the rotating crankshaft, each of the ring shaped elements is caused to distort, with each rotary accelerative force of the torsional vibration, from its annular concentric shape to a generally egg-shaped nonconcentric shape, the distortion of adjacent elements differing by reason of the difference in their spoke locations such that alternate elements move together and adjacent elements move with respect to each other due to the vibratory energy induced distortions. The ring shaped elements are tuned to a desired predetermined frequency selected to best meet the needs of the particular engine or engines for which the damper is designed and a coupling, preferably a friction coupling or a viscous coupling, is provided between adjacent ring shaped elements. Therefore, the relative movement of adjacent ring shaped elements by reason of the vibration induced distortion thereof results in either frictional or viscous absorption and dissipation of the vibratory energy. In the much preferred embodiment of the invention, each ring-shaped element comprises two rings, one connected to the hub by a single spoke as aforesaid and the other connected to the first ring by a single spoke positioned 180° from the spoke connecting the first ring to the hub. Hence, both rings can distort with respect to the hub and with respect to each other. With such construction a low stressed resilient inertia mass tuned to a relatively low frequency can be accomplished.

In the preferred frictional damper embodiment of the invention the friction coupling between adjacent ring shaped elements takes the form of friction pads located on each side of the center of rotation adjacent diametrical line oriented 90° from the spokes. In the preferred viscous damper embodiment of the invention, the casing or housing for the viscous fluid between the ring-shaped elements is constructed so that the side walls thereof are subject only to tension from the fluid pressure inherently resulting from centrifugal force, this feature enabling an extremely light weight housing structure to thereby increase the efficiency of the damper.

The above and other important objects, features, and advantages of the invention will appear more clearly from the following detailed description of preferred embodiments thereof made with reference to the drawings in which.

Figures 1, 2, 3:
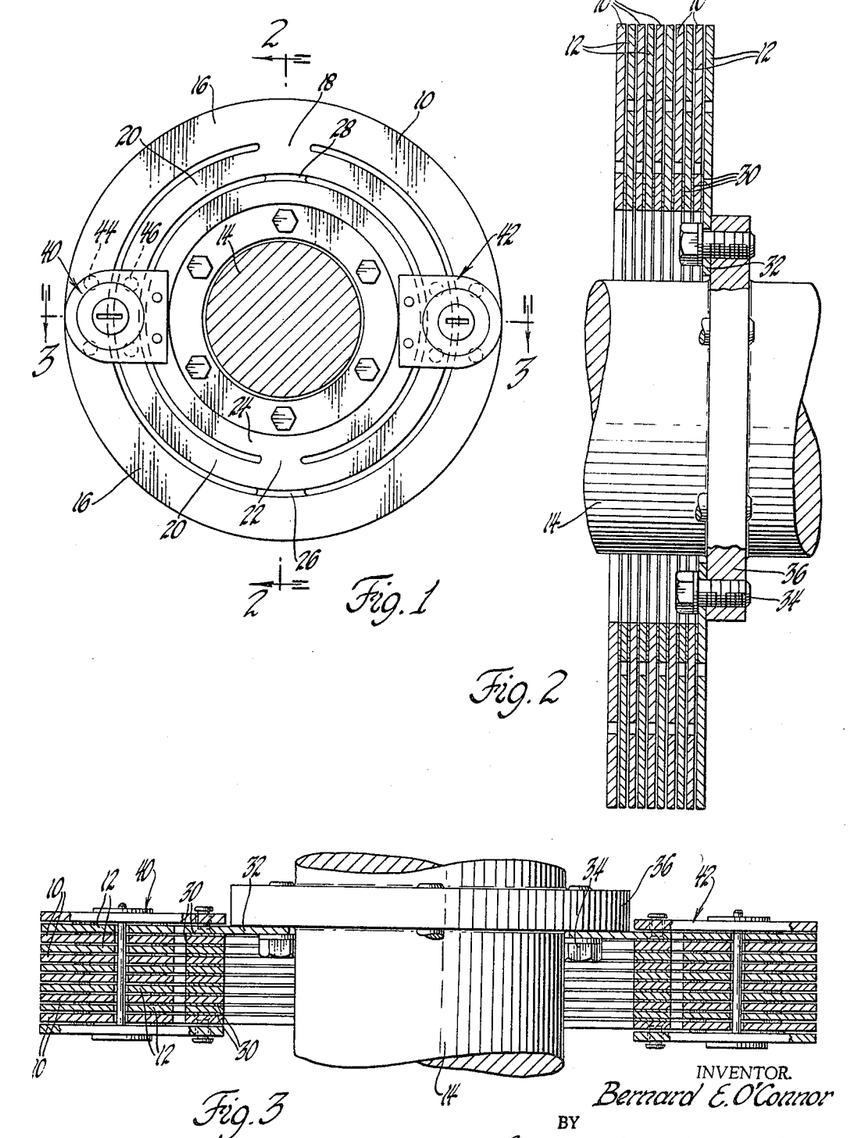
FIGURE 1 is a front view of a friction vibration damper constructed in accordance with the invention.
FIGURE 2 is a view taken on the line 2—2 of FIGURE 1.
FIGURE 3 is a view taken on the line 3—3 of FIGURE 1.

Referring now to FIGURES 1–3, the particular damper shown comprises a plurality of generally ring shaped elements, specifically ten such elements, five of which are designated with the reference numeral 10 and the other five of which are designated with the reference numeral 12. The elements 10 are all of substantially identical structure, as are the elements 12, and all of these elements are arranged in coaxially aligned closely adjacent relationship around the crankshaft 14, the elements 10 being arranged alternately with the elements 12. As can best be seen in FIGURE 1, each of the elements 10 is of unitary stamped sheet metal construction and comprises an outer resilient ring 16 connected by a single rigid (i.e. in the direction of rotation) spoke 18 to an inner resilient ring 20, this inner ring being connected by a single rigid (i.e. in the direction of rotation) spoke 22 to a hub portion 24, the spoke 22 being diametrically opposite the spoke 18. The elements are arranged such that the spokes 18 are all axially aligned with each other in the same radial direction from the shaft, the spokes 22 likewise being so axially aligned but at 180° from the spokes 18.

The elements 12 are of substantially the same structure as the elements 10, each having an outer resilient ring connected by a single rigid spoke 26 (see FIGURE 1) to an inner resilient ring, the inner ring being connected by a single rigid spoke 28 to a hub portion. Likewise, the spokes of the elements 12 are aligned with respect to each other as described for the element 10. However, the elements 12 are arranged at 180° to the elements 10 and hence the inner spokes 28 of the elements 12 are disposed 180° from the inner spokes 22 of the elements 10, and the outer spokes 26 are 180° from spokes 18. The elements are stacked in the relative positions as indicated with thin sheet metal shims 30 between the adjacent hub portions and the hub portions and shims therebetween are welded, brazed or pinned together to form the hub of the inertia mass. One of the elements is provided with a flange 32 extending radially inwardly from its hub portion for fixed securement by a plurality of bolts 34 to a radially outwardly extending flange 36 on the crankshaft 14.

The shims 30 provide spacing between adjacent surfaces of the inner rings and the adjacent surfaces of the outer rings of the elements 10 and 12. Within this spacing between adjacent elements and on each side of the inertia mass disposed about 90° from the location of the spokes are two friction couplings of substantially identical construction indicated generally by reference numerals 40 and 42 in FIGURES 1 and 3 and shown in greater detail in FIGURE 4.

Figure 4:
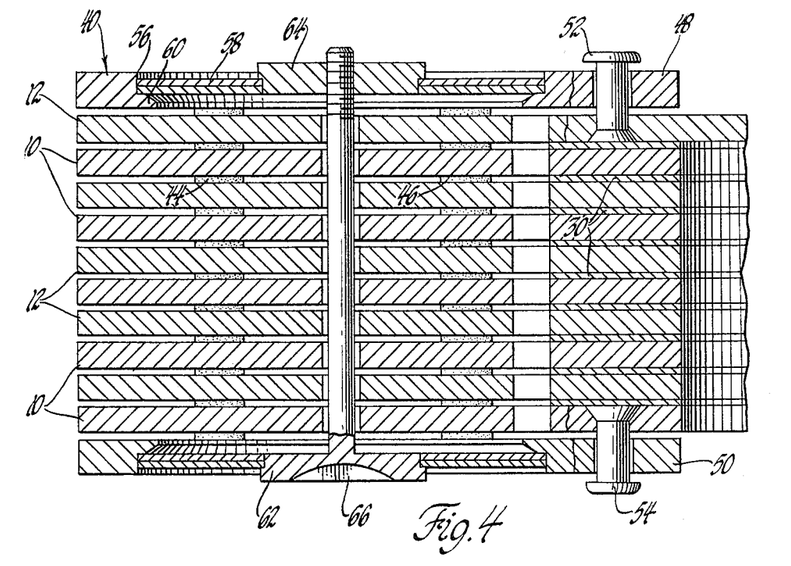
FIGURE 4 is a partial view in enlarged scale of the section shown in FIGURE 3.

Referring now to FIGURE 4, located between each pair of adjacent surfaces of the elements 10 and 12 is a group of four small disk-shaped friction pads, two of which are indicated by the reference numerals 44 and 46 in FIGURE 4. Each of these friction pads has one surface thereof bonded to the surface of one of the elements 10 or 12 and the oppositely disposed surface is slidable friction engagement with the surface of the adjacent element. For example, the pads 44 and 46 shown are bonded to the surface of one of the elements 10 as shown and are in slidable engagement with the adjacent element 12. In each group of the friction pads, two are positioned between the outer rings of adjacent elements 10 and 12 and the other two are positioned between the inner rings of the adjacent elements. This can best be seen in FIGURE 1. To provide the required frictional contact between the pads and the elements 10 and 12, there is provided a pair of plates 48 and 50, plate 48 being secured by a slidable rivet connection 52 to the hub of the inertia mass at one side thereof and the plate 50 being secured in like manner by slidable rivet connection 54 to the oppositely disposed side of the hub. The plates extend radially outwardly from their rivet connections, the latter allowing the plates to be moved toward or away from each other a slight amount. In the drawing, the amount of clearance between the rivets and the plates is exaggerated to illustrate the slidable connection; it is desirable to have a close sliding connection to maintain the plates in substantially parallel relationship to each other. Each of the plates is formed with washers 58, the periphery of which pair of washers rests against an inwardly extending annular flange 60 in the opening 56. An adjustment bolt 62, threadably engaging nut 64, extends through the space between the inner and outer rings of the elements 10 and 12, the bolt head and the nut engaging the inner edges of the spring washers 58. A slot 66 in the bolt head enables the bolt and nut assembly to be tightened to thereby cause the spring washers 58 to resiliently bias the elements 10 and 12 into frictional engagement with the friction pads. A group of friction pads is positioned between the plate 48 and the adjacent element 12 and a similar group is positioned between the plate 50 and adjacent element 10, such pads bonded to the plate and in slidable friction engagement with the surface of the elements 10 or 12 with which they are in contact. It will be manifest that by turning the adjustment bolt to tighten or loosen same, the amount of frictional contact pressure between the elements and the friction pads can be adjusted as desired.

The preferred material for the friction pads is Teflon (polytetrafluoroethylene) which has a low breakaway friction though other materials such as phenolic bonded asbestos or the like may be used if desired. Taflon in woven form set in a matrix of hard phenolic or the like resin, such as covered by U.S. Reissue Patent 24,765, is excellent.

Figure 5:
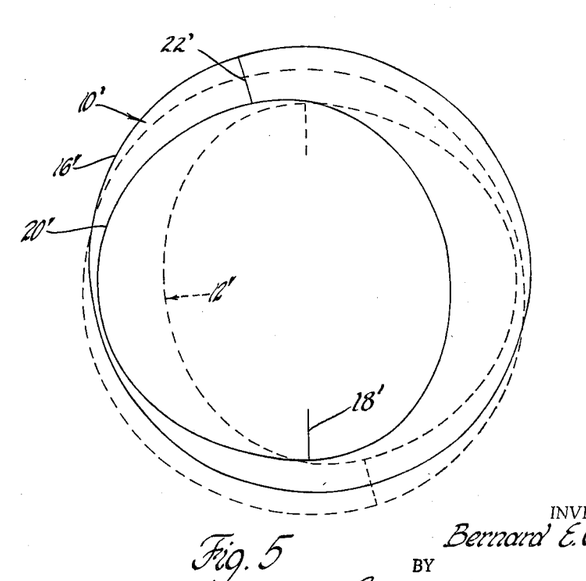
FIGURE 5 is a diagrammatic view of elements of the damper shown in FIGURE 1 and illustrates the function and operation of such elements.

Function and operation of the damper can best be understood by reference to FIGURE 5, which shows the manner in which the elements 10 and 12 distort during operation though for purposes of illustration the figure much exaggerates the distortion and hence is not intended to be accurate. In FIGURE 5, the centerline of each of the elements 10 is shown at 10' in unbroken lines and the centerline of each element 12 at 12' in broken lines.

As the crankshaft rotates, the entire vibration damper assembly rotates with it and when torsional vibration in the crankshaft occurs the elements 10 and 12 are, in effect, subjected to a series of rapid sequential rotary positive accelerations and negative accelerations (i.e. decelerations). FIGURE 5 illustrates distortion of the elements due to such a rotary acceleration. First with respect to element 10 (the centerlines of the rings and spokes of which are shown in unbroken lines in FIGURE 5), there is substantially no distortion of the inner ring 20' thereof at the location of its spoke connection 18' with the hub. Likewise, there is no distortion of the outer ring 16' with respect to the inner ring at the location of the spoke connection 22' between these rings. However, upon acceleration the remaining portions of the inner ring 20' undergo distortion, the movement of the ring from its natural shape due to such distortion being slight adjacent the location of the spoke connection with the hub and becoming greatest at a point about 180° from the spoke connection 18', or, in other words, at the location of spoke 22'. Such distortion occurs by reason of the lag of the ring due to inertia, the lag being permitted because of the resiliency of the ring. The outer ring 16' of the element 10' distorts in a similar manner with respect to the inner ring; however, because its rigid spoke connection 22' with the inner ring is 180° from the spoke connection of the inner ring to the hub, the movement of the outer ring with respect to the inner ring due to distortion is greatest at the location of the spoke connection 18' with the hub or in other words on the diametrically opposite side of the element 10' from where the distortion of the inner ring 20' is greatest. Hence, the entire element 10 undergoes distortion movement to a slightly egg shaped eccentric shape and position with respect to the hub, and by reason of the 180° difference in the spoke connections the outer ring undergoes distortion movement with respect to the inner ring.

The distortion movement of the inner and outer rings of element 12 (the centerlines of the rings and spokes of which are shown in broken lines in FIGURE 5) with respect to the hub and with respect to each other is the same is described for element 10 but 180° different in orientation because of the 180° difference in spoke locations. Hence, when the accelerations occur, the elements 10 and 12, and the inner and outer rings of each of them, undergo movement with respect to each other. Of course, the same relative movement, but in an opposite direction, occurs upon a negative acceleration (deceleration) with the overall result that as torsional vibrations occurs, there is relative to and fro movement, due to distortion, between the elements 10 and 12, the frequency of change in movement being the frequency of the torsional vibration. Whereas the greatest amount of distortional movement of any one ring of the elements, relative to the hub, occurs at a point on a line passing through the spokes of such element, the amount of relative distortional movement between elements 10 and 12 occurs at points on a line perpendicular to the spokes, the friction pads being locationed at or adjacent such line as shown in FIGURE 1.

Figure 9:
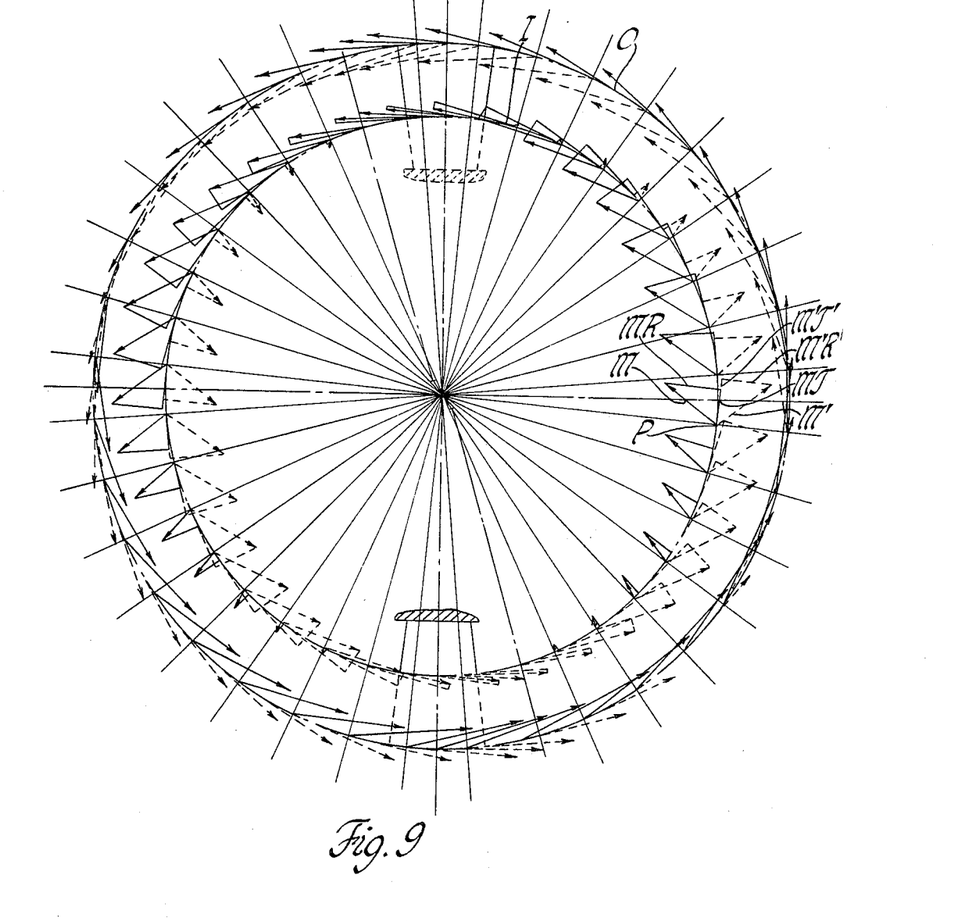
FIGURE 9 is a diagrammatic view of elements such as shown in FIGURE 5, and illustrating the radial and tangential components of movement of such elements during operation of the damper.

FIGURE 9 is a diagrammatic view showing the movement of the inner and outer rings of adjacent ring shaped elements at various circumferential points thereon. In this FIGURE 9 the centerlines of the inner rings of the two adjacent elements 10 and 12 are indicated at I and the centerlines of the outer rings of the elements are indicated at O. When the elements are in a static condition these centerlines are superimposed on each other as shown. The total movement and the radial and tangential components of the total movement of the circumferentially spaced points of the rings of one of the elements (during a momentary acceleration due to torsional vibration), are shown in unbroken lines and such movement of the rings of the other of the elements are shown in broken lines. Hence, for point P, the unbroken line M indicates the total movement of such point P on one of the inner rings, unbroken line MT being the tangential component of such movement and unbroken line MR beig the radical component. The broken line M' is the total movement of the point P on the other of the inner rings with M'T' being the tangential component of such movement and M'R' the radical component. Hence, if the outer ends of the lines depicting the total movements of the points on each of the rings are joined, the shapes of the rings during a vibratory acceleration are depicted, these shapes being about as shown in FIGURE 5. Of course, the movement depicted in FIGURE 9 is, as in FIGURE 5, much exaggerated for purposes of illustration, the movements of the points being shown about sixty-five times as great as in a typical actual such damper.

The aggregate of the elements 10 has the same weight and inertia as the aggregate of the elements 12 and the dimensions and material of the elements 10 and 12 are such as to provide these elements, and the composite inertia mass, with a natural frequency selected to best meet the requirements of the torsional vibration characteristic of the particular engine or engines for which the damper is designed. The relative movement between the elements 10 and 12 results in friction between the elements and the friction pads to thereby absorb and dissipate the vibratory energy. The amount of frictional contract pressure and hence the rate at which the vibratory energy is absorbed and dissipated can be adjusted by tightening or loosening the friction coupling adjusting bolts 62 as described above.

The optimum value for the natural frequency of the ring-shaped elements 10 and 12 for a given engine is a function of the inertia and natural torsional frequency of the engine and the inertia of the damper, and can be determined by computations well known in the torsional vibration damper art. In general it will be found that the optimum natural frequency for the elements 10 and 12 will be somewhat lower than the natural frequency of the engine in which the damper is to be used. For example, for a particular embodiment of the damper shown in FIGURES 1–4, which was designed for a six-cylinder diesel truck engine having a natural frequency of about 180 cycles per second, the natural frequency determined and selected for the elements 10 and 12 by conventional computations was 127 cycles per second.

In a damper incorporating a distortable annulus as the vibratory inertia member, as in the dampers of the present invention, the vibratory motion of a point on the annulus is a coupled tangential and radial motion, i.e., the motion has both tangential and radial components. The radial components result in a response of the system to exciting frequencies greater than the natural frequencies of the system (which is equivalent to the response of a system of lower natural frequency) and to exciting frequencies less than the natural frequencies of the system (which is equivalent to the response of a system of higher natural frequency). This can be an undesirable feature in a damper which is required to be effective over a large range of speeds. However, as will be manifest from FIGURE 9 this undesirable feature is substantially elimintaed in the preferred embodiment of the present invention wherein each of the annular vibratory elements comprise inner and outer rings which are joined by a single spoke for distortion with respect to each other. That is, the movement of the outer ring is primarily tangential, with only a small radial component, since the outer ring is connected to the inner ring at a point where the motion of the inner ring is substantially entriley tangential. Also, the mass of the outer ring is considerably greater than that of the inner ring. Hence, with such structure there is provided a system in which the energy in a radial direction is a minimum percentage of the total energy. With the damp shown in FIGURES 1–4, for example, the radial energy is less than 5% of the total energy. Of course for various damper applications, this advantage of the preferred embodiment may not be of paramount importance and hence, it is within the purview of the invention, in its broader scope, to utilize an annular distoratble inertia member other than one having the shape with inner and outer rings as shown and described.

An excellent material for the elements 10 and 12 is low carbon hot-rolled steel because of its low cost, ease of fabrication, and a fatigue strength which is comparable to that attained even where more expensive materials are used in structures such as this where stress risers exist.

Figure 6:
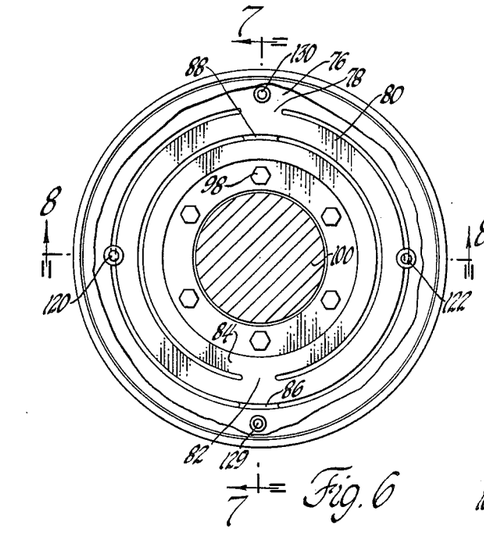
FIGURE 6 is a front view, with parts broken away, of the viscous damper constructed in accordance with the invention.
Figure 7:
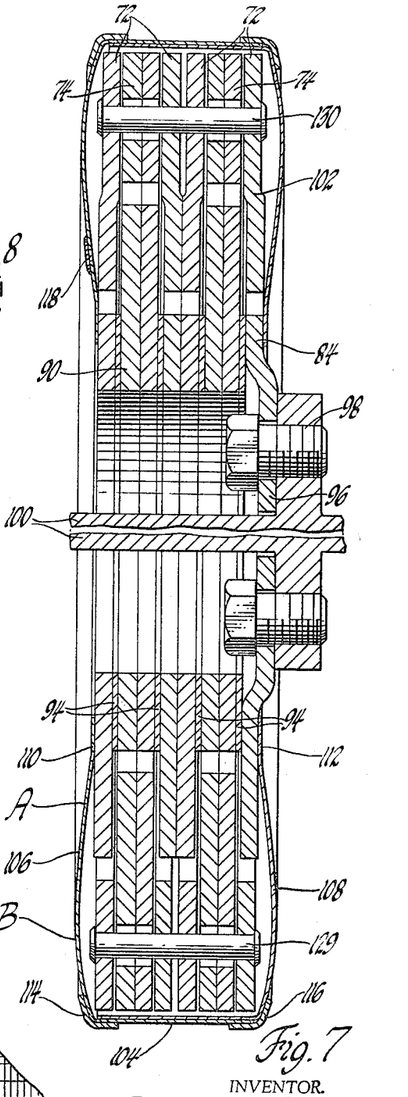
FIGURE 7 is a view taken on the line 7—7 of FIGURE 6 but with parts broken away.
Figure 8:
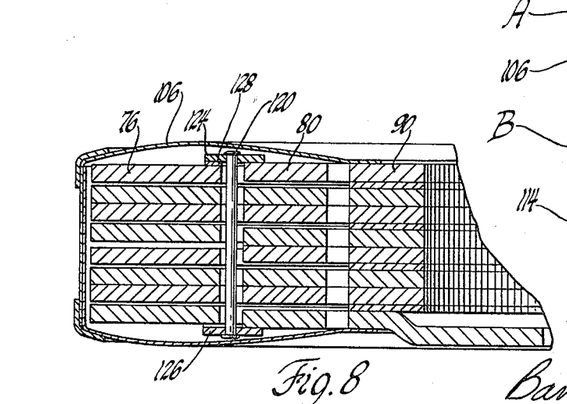
FIGURE 8 is a partial view taken on the line 8—8 of FIGURE 6.

FIGURES 6 through 8 show an embodiment of the invention wherein viscous rather than friction damping is employed. The damper shown incorporates a composite resilient inertia mass the same in fundamental structure as that described above with reference to the friction damper and including a plurality of coaxially arranged closely spaced ring shaped elements 72 and 74. In the embodiment shown each of the two elements 74 consists of two identical sheet metal stampings positioned face to face and functioning as a unit. Each of these elements 74 is positioned between a pair of elements 72. Each of the elements 72 is of unitary construction formed of sheet metal stock and comprises an outer ring 76 connected by a single rigid spoke 78 to an inner ring 80, the inner ring being connected by single rigid spoke 82 to the hub portion 84. The spoke 82 is diametrically opposite the spoke 78. Each of the elements 74 is likewise formed of sheet metal stock and comprises an outer ring connected by a ridigd spoke 86 to an inner ring in turn connected by a rigid spoke 88 to a hub portion 90, the orientation of these spokes 86 and 88 being 180° from the spokes 78 and 82, respectively of the elements 72. The elements 74 are only two in number whereas the elements 72 are four in number; however, each of the elements 74 is twice as thick and therefore twice as heavy as each element 72 whereby the aggregate mass of the elements 74 substantially equals the aggregate mass of the elements 72. As alluded to above, each element 74 comprises two identical punched metal sheet stock members placed together face to face as shown at 92. This simplifies manufacture. The sheet stock member can though need not be bonded together.

Annular sheet metal shims 94 are positioned between the hub portions of the elements 72 and 74, and the hub portions and shims are brazed, welded or riveted together to thereby form the hub of the resilient inertia mass. One of the elements 72 is formed with a radially inwardly extending flange 96 secured by bolts 98 to a flange on the cranckshaft 100.

As can best be seen by reference to FIGURE 7, the spacing between the outer rings of the elements 72 and 74 is less than the spacing between the inner rings. This difference in spacing is accomplished by providing a slight bend in the spokes 78 between the inner and outer rings of each element 72, this as shown at 102. With such bend, the plane of the outer ring of each element 72 is slightly displaced from the plane of the inner ring thereby accomplishing the lesser spacing between the outer rings of the elements. The purpose of this difference in spacing will be explained hereinafter in connection with the function and operation of the device.

An annular sheet metal housing having outer cylindrical wall 104 and generally radially extending outwardly bowed side walls 106 and 108 encases the inner and outer ring members of the elements 72 and 74 and is secured in sealed relationship with the hub 90 by welding or brazing the inner annular edges 110 and 112 of the housing side walls to the hub as shown. The housing is formed of two thin sheet metal stampings each with a cylindrical outer wall, the cylindrical outer wall nesting together whereby the wall 104 is double the thickness of the walls 106 and 108. The cylindrical outer walls of the two stampings are brazed together to form a seal. For reasons which will be set forth hereinafter, a pair of metal rings 114 and 116 each of generally L-shaped cross section are welded or brazed to the housing at the junction of the walls 106 and 108 with the outer cylindrical wall 104. The housing is filled with viscous fluid preferably a constant viscosity liquid such as silicone oil which is well known in the viscous damper art. A suitable opening for admitting the fluid to the housing is provided as indicated at 118. Once the fluid is admitted the opening can be permanently welded shut.

While not essential, it is desirable for stability of the rotating elements 72 and 74 to provide a pair of headed pins 120 and 122 each of which extends through the axially aligned spaces between the inner and outer rings of the elements and at a location about 90° from the spokes. As best seen in FIGURE 8, each pin has enlarged or head portions 124 and 126 at the ends thereof which bear against the elements to maintain them in parallel relationship. Since the plane of the outer ring of each element 72 is displaced from the inner ring thereof, each head portion of the pins is formed with a thicker section at one side thereof, as shown at 128, to provide uniform contact with the inner and outer rings. If still added stability is required, to assure that the elements do not distort or bend to non-planar shape during rotation, additional such pins may be used at circumferentially spaced points. For example, axially aligned holes can be provided in the elements in the outer rings thereof adjacent the spoke locations with the holes in one set of elements being smaller than those in the other set and with pins extending through the openings and secured to the one set of elements as shown at 129 and 130.

To further assure the maintenance of proper spacing between the elements, small pads of Teflon or the like, similar in structure to those shown at 44 and 46 in FIGURES 1 and 4, can be positioned between the elements just as described with reference to the FIGURE 1–4 embodiment. Of course such pads may provide some frictional damping but such is quite small, to the point of being negligible, in comparison to the viscous damping from the fluid.

In operation, torsional vibration of the crankshaft causes the ring shaped elements 72 and 74 to distort and hence to move relative to each other and relative to the hub in the same manner as described above with reference to FIGURE 5. Such relative movement is opposed by the viscous fluid between the elements 72 and 74, the vibratory energy thereby being absorbed and dissipated as heat. The extent of the damping effect of the fluid is a function of the viscosity, or more properly the shear modulus of the fluid, the size of the surface areas in contact with the fluid, the distance between the surfaces and the amount of relative movement between the surfaces. With these factors in mind and taking into account the difference in the areas of the inner and outer rings of the elements 72 and 74 and the amounts of relative motion between the outer rings and between the inner rings, it is desirable for maximum damping efficiency to use a greater distance between the inner rings of tht elements than between the outer rings. In this manner optimum damping from the inner rings as well as the outer rings is accomplished.

Of course, in this viscous embodiment, as in the friction embodiment previously described, the elements 72 and 74 are designed by choice of materials and dimensions to have a natural frequency which best meets the requirements of the torsional vibration characteristics of the particular engine or engines in which the damper is to be used.

For maximum engine and damping efficiency it is advantageous that the weight of the housing for the viscous fluid be a minimum. However, with conventional housing structure, reduction in weight results in insufficient housing strength to withstand the considerable pressure exerted by the fluid because of centrifugal force. With the housing as shown and described, ample strength is accomplished with an extremely light weight structure. The features of the housing shown which are important to this end are the reinforcing rings 114 and 116 and the outwardly bowed sectional configuration of the sidewalls 106 and 108, the double wall thickness of the outer cylindrical wall 104 also being a desirable feature.

The function of the rings is to prevent any radial inward collapse of the housing from pressures exerted by the fluid on the side walls 106 and 108. That is, fluid pressure against the side walls places them in tension and the rings albeit of lightweight construction are sufficiently strong that they cannot be collapsed radially inwardly irrespective of the pressure exerted on the side walls. The thickness and material of the sidewalls can thereby be selected not with a view to providing sufficient rigidity to assure against radial inward collapse of the housing but only with the view to providing sufficient tensile strength to assure against rupture of the sidewalls from the fluid pressure. Particularly with the bowed side wall structure now to be more fully described, ample tensile strength to assure against such rupture can be accomplished with very thin and therefore lightweight sheet stock.

The outer side walls 106 and 108 are bowed outwardly with an arcuate cross-sectional developed curvature, the same as that to which they would tend to be shaped or stretched by internal fluid pressure during rotation if they were initially made flat. It should be noted again in this regard that the outer peripheral cylindrical wall portion 104 and the inner rim wall of the casing formed by the hub are relatively thick and therefore sufficiently rigid to assure against radial collapse or any other distortion thereto. Hence the forces of internal fluid pressure exerted on the side walls 106 and 108 put them in tension between the cylindrical walls. Since the internal fluid pressure exerted on the side walls is greater toward the periphery of the casing than adjacent the hub, the walls, if initially made say flat, would tend to take the shape shown, i.e. an outwardly bowed shape with a cross sectional arcuate curvature having a larger radius of curvature at a point adjacent the hub such as indicated at A than at a point a greater distance from the hub such as indicated at B. Hence, the arcuate cross-sectional shape of the side walls is such that the casing has a progressively increasing width between outer side walls with its greatest width at a point B closer to the outer peripheral wall than to the inner rim wall. With the side walls so constructed the possibility of any distortion is substantially eliminated; during operation all portions of the side walls are under substantially the same amount of radial tension. Hence, maximum strength per unit housing weight is assured, each and all circumferential increments of the housing side walls being placed only in tension by the internal fluid pressure. The double thickness of the cylindrical outer wall of the housing provides ample strength against rupture or bowing of the outer wall and the manner of construction, by nesting one stamping in the other, requires minimum tooling and permits low cost manufacture.

These features of the casing structure can serve to advantage in other types of dampers and for other embodiments thereof reference is made to my U.S. patent application 385,951 filed concurrently herewith.

The combination of features as described, and particularly the structure of the inertia mass, provides a crankshaft torsional vibration damper which can be tuned to relatively low frequency and yet which is extremely durable in that the tuned inertia mass elements are subject only to low stresses. The damper is extremely efficient in operation and can be manufactured at relatively low cost. The dampers shown and described are fully adequate to meet the vibration damping needs of the most difficult to damp reciprocating engines such for example as six cylinder in-line diesel engines. In fact, the dampers of this invention because of their outstanding efficiency and durability will in many instances enable engine design modifications to increase the amount of useful horsepower obtainable albeit such engine modifications increase the demand on the damper. Because of the efficient reduction or elimination of torsional vibration stresses, reduction in the size and weight of the crankshaft can in some cases be accomplished.

In the preferred embodiments as shown and described, the vibration absorbing coupling instead of being between the inertia member and the hub, as is conventional, is between elements of the inertia mass adjacent the periphery thereof. This is advantageous chiefly in that it provides increased durability and a reduction in manufacturing costs, the latter because it eliminates the necessity for relatively expensive hub components. However, it should be understood that the improved inertia mass structure of this invention can, if desired be used in combination with a hub-located vibration absorbing coupling such as a friction coupling. If such is used, the inertia mass can, if desired, take the form of a single element of the mass and natural frequency desired rather than a plurality of elements.

The preferred structure for the inertia mass provides various important advantages. First, because the elements are all substantially identical and can be stamped from inexpensive steel sheet stock, the inertia mass can be manufactured at very low cost. The feature of having a single rigid spoke connection between the hub and the distortable ring-shaped portion further contributes to low manufacturing cost since it eliminates the need for relatively expensive pivot connections that would otherwise be necessary to enable free distortion of the ring-shaped portion. As alluded to above, the elements can be tuned to a relative low frequency and yet without there being any high stressed portions during operation. The specific structure shown, with an inner ring and an outer ring connected by a single rigid spoke, is much preferred; however, it should be understood that other structures may be used all within the spirit and scope of the invention. For example, instead of using inner and outer rings in the same plane, as shown, the elements can comprise a first ring connected to the hub by a single rigid spoke and a second ring, of about the same diameter as the first ring, positioned alongside the first ring in a plane parallel to that of the first ring and with the second ring connected to the first by a single rigid spoke having its axis parallel to that of the hub. Also, the ring shaped element can, if desired, be formed of a single ring connected to the hub by a single rigid spoke though with such structure there is some sacrifice in damping efficiency or in durability where optimum results require tuning to a low frequency.

Hence, it will be understood that whereas optimum results are attained with the combination of features as described in conjunction with the preferred embodiments of the invention, the features may be used in other combinations and various changes and modifications can be made all within the spirit and scope of the claims which follow:

I claim:

1. A torsional vibration damper comprising at least two elements extending radially outwardly from a member subject to the torsional vibration, said elements being secured to said member for rotary movement therewith and being non-rotatable with respect to said member and with respect to each other, each of said elements undergoing vibratory movement relative to the other of said elements upon occurrence of the torsional vibration, and a coupling between said elements for absorbing and dissipating the energy of the vibratory movement therebetween.

2. A torsional vibration damper as set forth in claim 1 wherein said elements have a predetermined natural frequency of vibration.

3. A torsional vibration damper as set forth in claim 1 wherein the coupling is a friction coupling.

4. A torsional vibration damper as set forth in claim 3 and having means for adjusting the frictional contact pressure in the coupling.

5. A damper as set forth in claim 3 wherein said friction coupling is of a material which includes polytetrafluoroethylene.

6. A torsional vibration damper as set forth in claim 1 wherein the coupling is a viscous coupling formed by a viscous fluid between said elements.

7. A torsional vibration damper comprising at least two resilient distortable generally ring-shaped elements each secured by a single spoke to a member subject to the torsional vibration, each of said elements undergoing vibratory distortional movement relative to the other of said elements upon occurrence of the torsional vibration, and a coupling between said elements for absorbing and dissiplating the energy of the vibratory movement therebetween.

8. A torsional vibration damper for a rotary member comprising at least two generally ring-shaped resilient distortable elements each having a predetermined natural frequency of vibration and each secured by a single spoke to said rotary member in generally concentric relationship therewith, said spokes being at an angle of 180° with respect to each other and each of said elements undergoing vibratory movement relative to the other of said elements upon occurrence of the torsional vibration in said rotary member, and a coupling between said elements for absorbing and dissipating the energy of the vibratory movement therebetween.

9. A torsional vibration damper as set forth in claim 8 wherein each of said ring shaped elements comprises a first ring portion and a second ring portion coaxial with said first ring portion and secured thereto by a spoke disposed at 180° from the spoke which secures the element to the rotary member.

10. A torsional vibration damper comprising a hub adapted to be secured to the member subject to the torsional vibration for rotary movement therewith, at least two adjacent generally ring shaped elements in generally concentric relationship with said hub, means securing said elements to said hub in non-rotatable relationship with respect to said hub and with respect to each other, said elements being resiliently distortable whereby each of said elements can undergo vibratory distortional movement relative to the hub and relative to the other of said elements upon occurrence of the torsional vibration, and a coupling between said elements for absorbing an dissipating the energy of the vibratory movement therebetween.

11. A damper for a rotary member subject to torsional vibration comprising a hub adapted to be secured to said member for rotary movement therewith, an annular inertia mass having a predetermined natural frequency of vibration rotatable with said hub and including a plurality of generally ring-shaped elements in generally concentric relationship with respect to said hub, each of said elements havnig an inner distortable resilient ring portion secured to said hub by a single inner spoke and an outer distortable resilient ring portion secured to said inner ring portion by a single outer spoke disposed 180° from said inner spoke, the inner spokes of adjacent ring shaped elements being disposed 180° from each other whereby the adjacent elements undergo vibrating distortional movement with respect to each other upon occurrence of torsional vibration in said rotary member, and a coupling between said ring shaped elements for absorbing and dissipating the energy of the vibratory distortional movement therebetween.

12. A damper as set forth in claim 11 wherein the friction coupling comprises friction pads between the inner and outer ring portions of adjacent elements and located radially of said hub at about 90° to said spokes.

13. A damper as set forth in claim 11 wherein said coupling is a viscous coupling formed by a viscous fluid between said elements.

14. A damper as set forth in claim 11 which includes an annular casing for said fluid, said casing having annular side walls each with the inner edge thereof secured in sealed relationship to the hub and each bowed outwardly from the inertia mass whereby each side wall has an arcuate cross section.

15. A damper as set forth in claim 14 wherein the cross sectional curvature of the side walls of said casing is such that all portions of the side walls are under substantially equal tension from the internal fluid pressure on the side walls during rotation of the damper.

16. A damper as set forth in claim 14 wherein said casing has an outer generally cylindrical wall with reinforcing rings surrounding and secured thereto to inhibit radial inward collapse of said casing from pressure on the side walls thereof.

17. A damper as set forth in claim 13 wherein the outer ring portions of adjacent ring shaped elements are spaced more closely to each other than are the inner ring portions of said adjacent ring shaped elements.

18. A damper for a rotary member subject to torsional vibration comprising a hub adapted to be secured to said member for rotary movement therewith, an annular inertial mass having a predetermined natural frequency of vibration rotatable with said hub and including a plurality of flat generally ring-shaped substantially identical metal elements all parallel to each other and in generally concentric relationship with respect to said hub, each of said elements having an inner distortable resilient ring portion secured to said hub by a single inner spoke and an outer distortable resilient ring portion secured to said inner ring portion by a single outer spoke disposed 180° from said inner spoke, the inner spokes of adjacent ring shaped elements being disposed 180° from each other whereby the adjacent elements undergo vibrating distortional movement with respect to each other upon occurrence of torsional vibration in said rotary member, and a coupling between said ring shaped elements for absorbing and dissipating the energy of the vibratory distortional movement therebetween.

19. A torsional vibration damper comprising at least one inertial mass having a hub and a resilient distortable generally ring-shaped element having a predetermined natural frequency of vibration and secured generally concentrically to said hub by a single spoke for rotation therewith, a member movable with respect to said generally ring-shaped element and a coupling between said inertia mass and said member for absorbing and dissipating the energy of vibrating distortional movement of said ring-shaped element.

20. A torsional vibration damper as set forth in claim 19 wherein said coupling is a friction material.

21. A torsional vibration damper as set forth in claim 19 wherein said coupling is a viscous fluid.

22. In a torsional vibration damper, an inertia mass comprising a hub, a resilient ring connected to said hub generally concentrically with respect thereto and a second resilient ring connected to said first mentioned ring generally concentrically with respect thereto, said rings being distortable with respect to each other and with respect to said hub upon rotary acceleration of said hub.

23. In a torsional vibration damper, a generally annular inertial mass comprising a hub, a resilient inner ring connected by a single spoke to said hub generally concentrically with respect thereto and an outer resilient ring connected by a single spoke to said inner ring generally concentrically with respect thereto, said spokes being disposed 180° from each other and said rings being distortable with respect to each other and with respect to said hub upon rotary acceleration of said hub.

24. In an article of manufacture of the type incorporating a rotating annular mass of liquid, an annular casing for and rotatable with the liquid having substantially rigid side walls which are bowed outwardly with an arcuate cross section having a substantially smooth developed curvature such that all portions of each side wall are under substantially equal radial tension from the internal pressure of the liquid during rotation of the casing.

25. An article of manufacture as set forth in claim 24 wherein said casing has an outer perpheral wall with at least one reinforcing ring surrounding and secured thereto to inhibit radially inward collapse of said casing from internal pressure on the side walls thereof.

26. A torsional vibration damper comprising an annular casing containing a liquid and having side walls which are bowed outwardly with a substantially smooth continuously curved cross section, and an annular inertia member in concentric relationship within said casing.

27. A torsional vibration damper comprising an annular casing containing a liquid, said casing having an inner rim wall portion, an outer peripheral wall portion and outwardly bowed side walls, said side walls having an arcuate cross section with a developed curvature such that the cross sectional width of the casing between the side walls is greatest at a point closer to said peripheral wall portion than to said rim wall portion.

28. In an article of manufacture of the type incorporating a rotating annular mass of liquid, an annular casing for and rotatable with the liquid having spaced annular side walls which are bowed outwardly with a substantially smooth continuously curved cross section, an outer peripheral wall joining said spaced side walls and a pair of reinforcing rings, one of said rings being secured around the casing adjacent the line of juncture between said outer wall and one of said side walls, and the other of said rings being secured around the casing adjacent the line of juncture between said outer wall and the other of said side walls.

29. In an article of manufacture of the type incorporating a rotating annular mass of viscous fluid, an annular casing formed of two metal stampings of substantially identical shape each comprising an annular side wall and a cylindrical outer wall, said stampings being assembled and sealed together with the outer wall of one of the stampings nested within the outer wall of the other of the stampings whereby said casing has spaced annular side walls and an outer cylindrical wall having a thickness twice that of each of the side walls.

References Cited by the Examiner

UNITED STATES PATENTS

| | | | |
|---|---|---|---|
| 1,719,805 | 7/1929 | Hammond | 74—574 |
| 2,939,338 | 6/1960 | Troyer | 74—574 |
| 3,212,827 | 10/1965 | Brettrager. | |

FOREIGN PATENTS 514,854  12/1930  Germany.

FRED C. MATTERN, JR., *Primary Examiner.*

MILTON KAUFMAN, *Examiner.*

W. S. RATLIFF, *Assistant Examiner.*